(12) United States Patent
Kawano et al.

(10) Patent No.: US 7,225,346 B2
(45) Date of Patent: May 29, 2007

(54) INFORMATION PROCESSOR, PROGRAM, STORAGE MEDIUM, AND CONTROL METHOD

(75) Inventors: Seiichi Kawano, Kanagawa (JP); Shinji Matsushima, Yokohama (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 402 days.

(21) Appl. No.: 10/731,903

(22) Filed: Dec. 10, 2003

(65) Prior Publication Data
US 2004/0215989 A1 Oct. 28, 2004

(30) Foreign Application Priority Data
Apr. 22, 2003 (JP) ............................ 2003-117054

(51) Int. Cl.
G06F 1/00 (2006.01)
G06F 1/26 (2006.01)
G06F 1/32 (2006.01)

(52) U.S. Cl. .................... 713/300; 713/320; 713/322; 713/323

(58) Field of Classification Search ................ 713/300
See application file for complete search history.

(56) References Cited

U.S. PATENT DOCUMENTS 5,623,677 A * 4/1997 Townsley et al. ........... 713/310
5,627,788 A * 5/1997 Chang et al. ............... 365/204
5,812,860 A * 9/1998 Horden et al. .............. 713/322
6,161,187 A * 12/2000 Mason et al. ............... 713/322
6,802,015 B2 * 10/2004 Atkinson .................... 713/322
6,920,574 B2 * 7/2005 Youngs ....................... 713/324
7,007,180 B2 * 2/2006 Hashimoto ................. 713/320

FOREIGN PATENT DOCUMENTS

JP 2002-304232 10/2002
JP 2003-006179 1/2003

* cited by examiner

Primary Examiner—Chun Cao
Assistant Examiner—Ji H. Bae
(74) Attorney, Agent, or Firm—Kunzler & McKenzie; Carlos Munoz-Bustamante

(57) ABSTRACT

There is provided an information processor including a central processing unit that includes an instruction execution module and has a normal mode for operating the instruction execution module and an execution halt mode for halting the instruction execution module. The information processor comprises a voltage controlling module for causing the instruction execution module to execute a voltage reduction instruction for placing the central processing unit into a low-voltage operation mode in which the operating voltage of the central processing unit is lowered from the operating voltage in the normal mode when the central processing unit switches from the normal mode to the execution halt mode; and a mode controlling module for placing the central processing unit into a low-voltage halt mode in which the instruction execution module is halted under the operating voltage for the low-voltage operation mode when the voltage controlling module places the central processing unit into the low-voltage operation mode.

11 Claims, 6 Drawing Sheets

INFORMATION PROCESSOR, PROGRAM, STORAGE MEDIUM, AND CONTROL METHOD

FIELD AND BACKGROUND OF INVENTION

The present invention relates to an information processor, program, storage medium, and control method and, in particular, to an information processor, program, storage medium, and control method that allow for reduction in power consumption.

In these years, power saving technology of increasing battery operation time of a portable information processing terminal and the like is attracting attention. For example, a technology has been used that changes the operating frequency and operating voltage of a central processing unit according to the amount of computation (see "Intel Low-Power Technologies" (by Intel Corporation, 2002; Intel White Paper; URL: http://www.intel.com/ebusiness/pdf/prod/related_mobile/wp021601.pdf)). Furthermore, another technology has been used that discontinue clock supply to a central processing unit to reduce power consumption (see Advanced Configuration and Power Interface Specification Revision 2.0a" (Compaq Computer Corporation and four other companies, Mar. 31, 2002)).

Information processors incorporating these two technologies have been used. However, these conventional information processors cannot effectively combine the two technologies to reduce power consumption. For example, these information processors are not efficient because a high voltage may be supplied to the central processing unit according to the technology described in non-patent literature 1 even though clock supply to the central processing unit is stopped according to the technology described in non-patent literature 2.

Therefore, an object of the present invention is to provide an information processor, program, storage medium, and control method that solve the problem. The object is achieved by the combination of features set forth in the independent claims herein. The dependent claims define preferable, specific embodiments of the present invention.

SUMMARY OF THE INVENTION

According to a first embodiment of the present invention, there are provided an information processor, a method for controlling the information processor, a program for causing the information processor to operate, and a storage medium on which the program is stored. The information processor includes a central processing unit (CPU) having an instruction execution module. The CPU has a normal mode for operating said instruction execution module and an execution halt mode for halting said instruction execution module. The information processor comprises a voltage controlling module for causing the instruction execution module to execute a voltage reduction instruction for placing the CPU into a low-voltage operation mode in which the operating voltage of said CPU is lowered from the operating voltage in the normal mode when the CPU switches from the normal mode to the execution halt mode; and a mode controlling module for placing the CPU into a low-voltage halt mode in which the instruction execution module is halted under the operating voltage for the low-voltage operation mode when the voltage controlling module places the CPU into the low-voltage operation mode.

The summary of the present invention provided above is not a complete list of the essential features of the present invention. Sub-combinations of the features are also included in the present invention.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
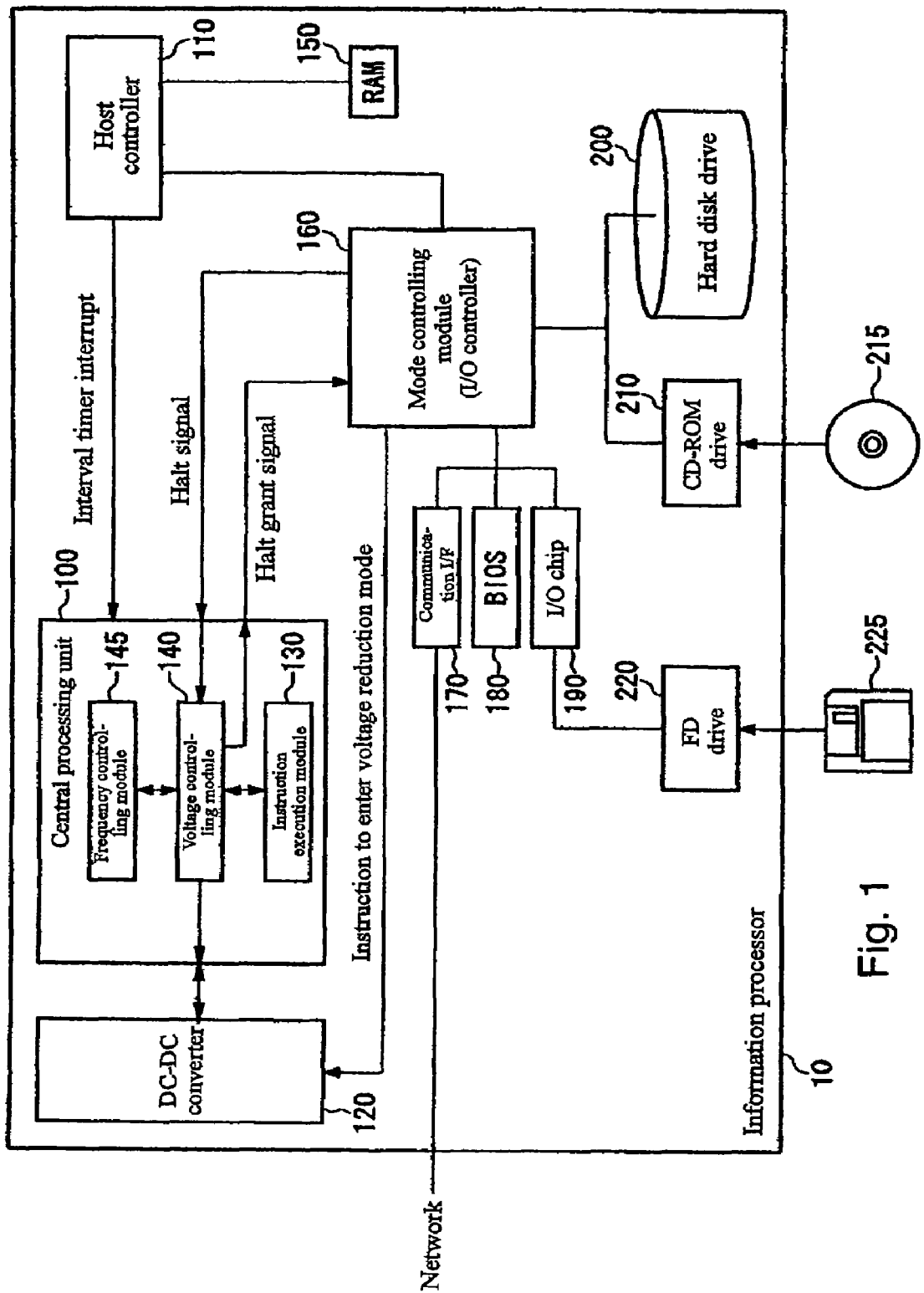
FIG. 1 shows a block diagram of an information processor 10.

FIG. 1 shows a block diagram of an information processor 10. The information processor 10 has a number of operation modes that provide different amounts of power consumption and can switch between these operation modes to reduce power consumption. The information processor 10 comprises a CPU 100, a host controller 110, a DC-DC converter 120, a RAM 150, a mode controlling module 160, a communication interface 170, a BIOS 180, an I/O chip 190, a hard disk drive 200, a CD-ROM drive 210, and a flexible disk drive 220.

The CPU 100 has an instruction execution module 130 that executes instructions stored in the RAM 150. The CPU 100 has a normal mode for operating the instruction execution module 130 and an execution halt mode for halting the operation of the instruction execution module 130. The CPU 100 acts as a voltage controlling module 140 and a frequency controlling module 145 that cause the instruction execution module 130 to execute a program installed in the hard disk drive 200 and loaded into the RAM 150.

When the CPU 100 receives a halt instruction from the mode controlling module 160 for placing the CPU 100 in the execution halt mode, the voltage controlling module 140 causes the instruction execution module 130 to execute a power reduction instruction for placing the CPU in a low-voltage operation mode in which the operating voltage of the CPU 100 is lowered from that in the normal mode. The voltage controlling module 140 sends an instruction for changing the operating voltage of the CPU 100 to the DC-DC converter 120 to lower the operating voltage of the CPU 100. After causing the instruction execution module 130 to execute the power reduction instruction, the voltage controlling module 140 sends a halt grant signal to the mode controlling module 160 for allowing the instruction execution module 130 to halt.

When the CPU 100 receives a halt instruction from the mode controlling module 160, the frequency controlling module 145 causes the instruction execution module 130 to execute a frequency reduction instruction for placing the CPU 100 in a low-frequency operation mode in which the operating frequency of the CPU 100 is lowered from that in the normal mode. Preferably, the voltage reduction instruction is identical to the frequency reduction instruction. This means that the voltage controlling module 140 and the frequency controlling module 145 cause the instruction execution module 130 to execute the voltage reduction instruction including the capability of the frequency reduction instruction to place the CPU 100 in an operation mode that is at once the low-voltage mode and the low-frequency mode.

The halt instruction may be a clock halt instruction that halts the internal clock of the CPU 100. It may be the STPCLK# signal for a Pentium processor, for example. The halt grant signal may be a signal that allows the clock provided to the CPU 100 from a source external to the CPU 100 to halt. The signal may be, for example, the STOP GRANT BUS CYCLE or the STPGNT# signal provided from a Pentium processor.

The host controller 110 connects the RAM 150 to the CPU 100, which accesses the RAM 150 at a high transfer rate. The DC-DC converter 120 converts a power supply voltage provided from an AC adapter or a battery and supplies the converted voltage to the CPU 100. In response to an instruction from the CPU 100 or the mode controlling module 160, the DC-DC converter 120 changes the voltage to be supplied to the CPU 100. For example, the DC-DC converter 120 receives notification of voltage reduction from the power controlling module 140 of the CPU 100 and changes the voltage to be supplied to the CPU 100. When the DC-DC converter 120 receives an instruction to place the CPU 100 in a voltage reduction mode that halts the instruction execution module 130 at an operating voltage lower than those in the low-voltage operation mode and low-voltage halt mode from the mode controlling module 160, the DC-DC converter 120 accordingly changes voltage to be supplied to the CPU 100. The instruction for placing the CPU 100 in the voltage reduction mode may be DPRSLP# signal in Pentium.

While the CPU 100 is in the normal mode, the mode controlling module 160 periodically sends a halt instruction to the CPU 100. When the mode controlling module 160 receives a halt grant signal from the CPU 100, that is, the voltage controlling module 140 causes the instruction execution module 130 to execute a voltage reduction instruction, the mode controlling module 160 places the CPU 100 in a low-voltage halt mode to halt the instruction execution module 130 while maintaining the operating voltage and frequency in the low-voltage operation mode. In addition, the mode controlling module 160 may send an instruction to the DC-DC converter 120 for placing the CPU 100 in the voltage reduction mode according to information preset in the information processor 10.

Furthermore, the mode controlling module 160 receives an interrupt request for resuming the instruction executing module 130 from the I/O chip 190 and sends it to the CPU 100 through the host controller 110. The interrupt request may be an interval timer interrupt that is provided to the central processing unit 100 at regular intervals to cause the instruction execution module 130 to execute instructions for detecting executable processes. The interrupt request may be an I/O interrupt provided from an input/output device to the CPU 100 in order to access the RAM 150. In response to this, the CPU 100 enters the low-voltage operation mode from the low-voltage halt mode, for example, to execute an executable process.

The mode controlling module 160 may be included in a South Bridge, which is an I/O controller controlling the central processing unit 100, and connects the host controller 110 with the communication interface 170, the hard disk drive 200, and the CD-ROM drive 210, which are relatively high-speed input/output devices. The communication interface 170 communicates with other devices through a network. The hard disk drive 200 stores programs and data used by the information processor 10. The CD-ROM drive 210 reads a program or data from a CD-ROM 215 and provides it to the CPU 100 through the RAM 150.

Also connected to the mode controlling module 160 are relatively low-speed input/output devices, such as the BIOS 180, the flexible disk drive 220 and the I/O chip 190. The BIOS 180 stores programs such as a boot program executed by the CPU 100 during starting up the information processor 10 and programs dependent on hardware of the information processor 10. The flexible disk drive 220 reads a program data from a flexible disk 225 and provides it to the CPU 100 through the RAM 150. Connected to the I/O chip 190 are a flexible disk 225 and, various input/output devices through a parallel port, serial port, keyboard port, and mouse port and the like. The I/O chip 190 sends a signal indicating an interval timer interrupt to the host controller 110 and the CPU 100 through the mode controlling module 160.

A program to be provided to the information processor 10 is stored in a storage medium such as a flexible disk 225, a CD-ROM 215, or IC card and is provided to the information processor 10 by a user. The program is read from the storage medium and installed in the information processor 10 through the I/O chip 190 or other components and executed in the information processor 10. The program installed and executed in the information processor 10 comprises a voltage controlling module, a frequency controlling module, and mode controlling module. These modules cause the information processor 10 to perform the same operations that are performed by their corresponding components of the information processor 10 described above. The description of the modules therefore will be omitted here.

The program and modules, described above may be stored in an external storage medium, which may be a flexible disk 225, a CD-ROM 215, as well as an optical storage medium such as a DVD and PD, a magneto-optical disk such as an MD, a tape, or a semiconductor memory such as an IC card. Alternatively, a storage device such as a hard disk or a RAM provided in a sever system connected to a private communication network or the Internet may be used as a storage medium to provide the program may be provided to the information processor 10 through a network.

The voltage control module 140 and the frequency control module 145 in the example shown in FIG. 1 are software modules executed by the CPU 100 and are implemented as an operating system, BIOS, or device driver. Alternatively, they may be hardware modules provided in the CPU 100 or may be implemented as microcodes of the CPU 100 that operate when a predetermined instruction is executed.

As shown in FIG. 1, when the information processor 10 switches from the normal mode to the execution halt mode, it enters the low-voltage operation mode in which the operating voltage and frequency of the CPU 100 are decreased, and then enters low-voltage halt mode in which the instruction execution module 130 is halted. Thus, the operating voltage of the CPU 100 and therefore power consumption in the CPU 100 can be reduced with the operation of the instruction execution module 130 being halted.

Figure 2:
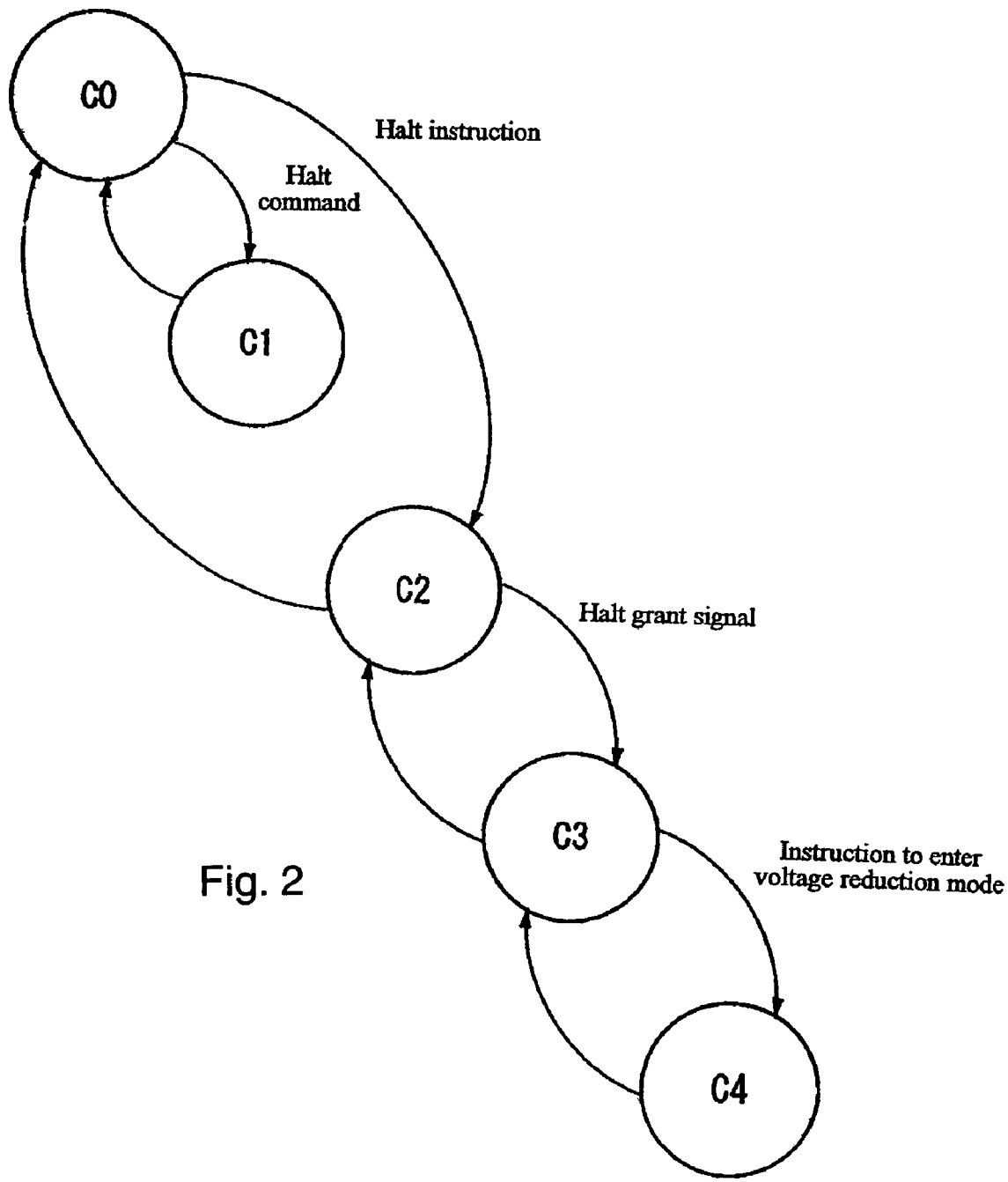
FIG. 2 shows a diagram illustrating shifts between operation modes of a CPU 100.

FIG. 2 is a diagram illustrating shifts between operation modes of the CPU 100. The CPU 100 has a C0 processor power state, which is an example of the normal mode and in which the instruction execution module 130 operates, C1, C2, and C3 processor power sates, each of which an example of the low-voltage halt mode and in which the instruction execution module 130 halts, and a C4 processor power state, which is an example of the voltage reduction mode. These processor power states are defined in the ACPI (Advanced Configuration and Power Interface) standard, for example.

When the CPU 100 executes a halt instruction in the C0 processor power state, it shifts to the C1 processor power state. When the CPU 100 receives a halt instruction from the mode controlling module 160 in the C0 processor power state, it shifts to the C2 processor power state. When the stoppage of clock supply to the CPU 100 becomes possible in the C2 processor power state, the CPU 100 outputs a halt grant signal in response to the halt instruction. Receiving the halt grant signal, the mode controlling module 160 stops the clock supplied to the CPU 100 without changing the voltage provided to the CPU 100 to place the CPU 100 in the C3 processor power state. Furthermore, the mode controlling module 160 may stop a PLL (Phase Lock Loop), which is a high-frequency generator provided within the CPU 100, by stopping the clock supply to the CPU 100.

The mode controlling module 160 may send in the C3 processor power sate an instruction for placing the CPU 100 in the voltage reduction mode to the DC-DC converter 120 to place the CPU 100 in the C4 processor power state.

When an interval timer interrupt or an I/O interrupt occurs in the C4 processor power state, the mode controlling module 160 sends an instruction for returning the CPU 100 from the voltage reduction mode to the DC-DC converter 120 to return the CPU 100 to the C3 processor power state. Then the mode controlling module 160 resumes the clock supply to the CPU 100 to return the CPU 100 to the C2 processor power sate. The CPU 100 then restarts its internal clock to enter the C0 processor power state. When the CPU 100 receives an interval timer interrupt or an I/O interrupt in the C1 processor power sate from the mode controlling module 160, it shifts to the C0 processor power state.

In this way, the CPU 100 has the C0 processor power state in which the instruction execution module 130 is operated, and the C1 to C4 processor power states in which the instruction execution module 130 is halted.

Figure 3:
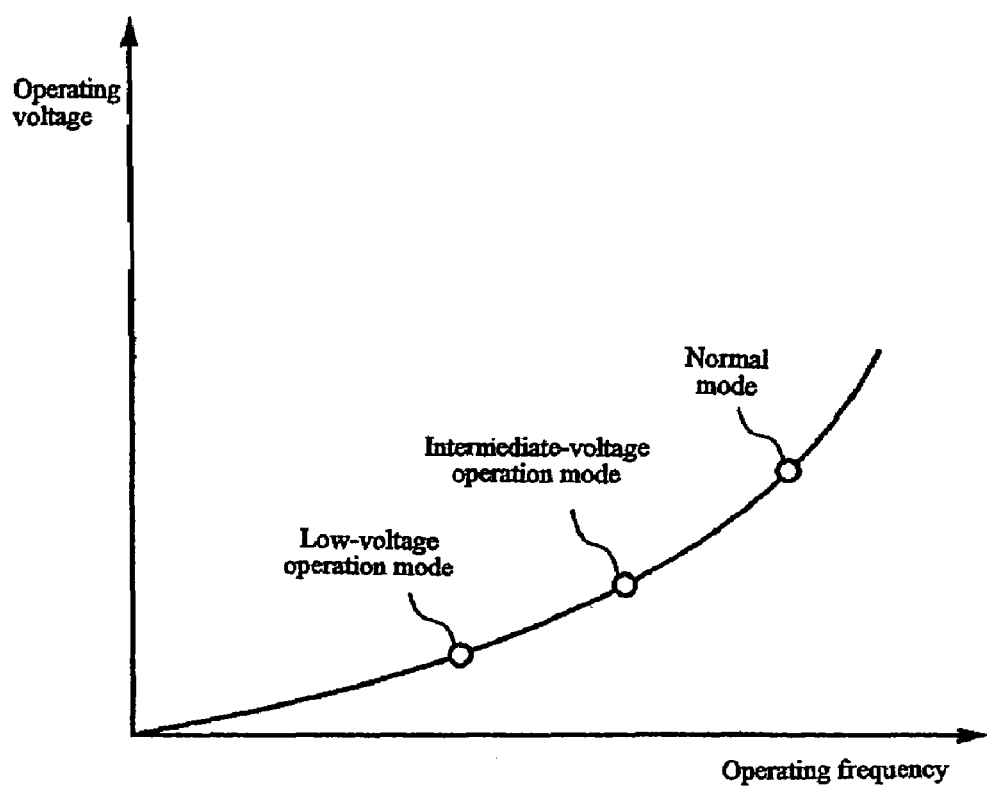
FIG. 3 shows the operating voltage versus the operating frequency of the CPU 100.

FIG. 3 shows the operating voltage versus the operating frequency of the CPU 100. The CPU 100 executes a voltage reduction instruction to reduce the operating voltage and also reduces the operating frequency. For example, the CPU 100 has a normal mode, an intermediate-voltage operation mode in which the operating voltage is lower than that in the normal mode and the operating frequency is lower than that in the normal mode and a low-voltage operation mode in which the operating voltage and the operating frequency are lower than those in the intermediate-voltage operation mode.

As shown in FIG. 3, the CPU 100 has the normal mode, the intermediate-voltage operation mode, and the low-voltage operation mode in order to minutely control power consumption depending on processes even in the C0 processor power state in which the instruction execution module 130 is operated. For example, the CPU 100 uses the SpeedStep technology to control the operating voltage and the operating frequency as shown in FIG. 3.

Figure 4:
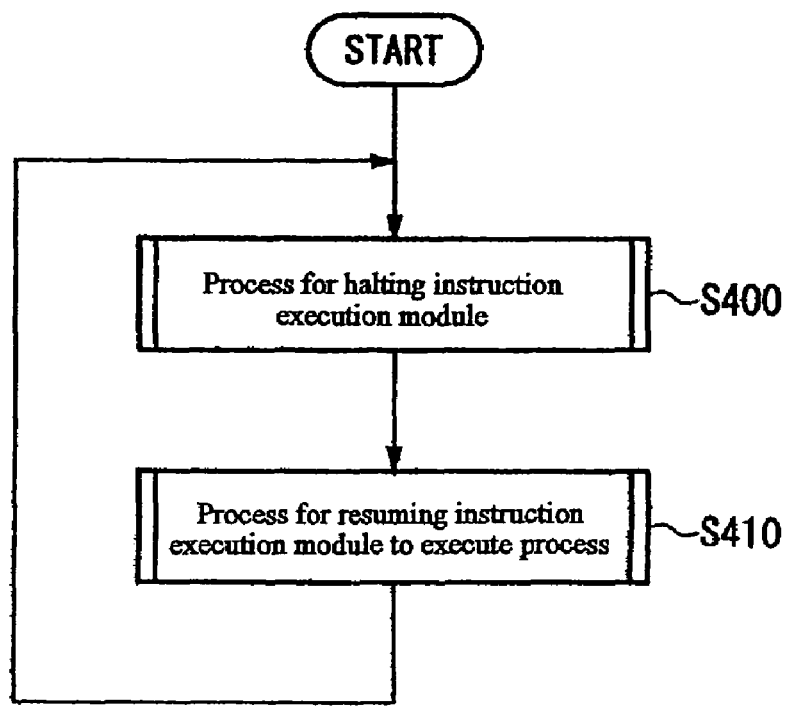
FIG. 4 shows a flowchart of a process performed in the information processor 10.

FIG. 4 shows a flowchart of a process performed in the information processor 10. The information processor 10 repeatedly performs a process (S400) for halting the instruction execution module 130 and a process (S410) for resuming the instruction execution module 130.

Figure 5:
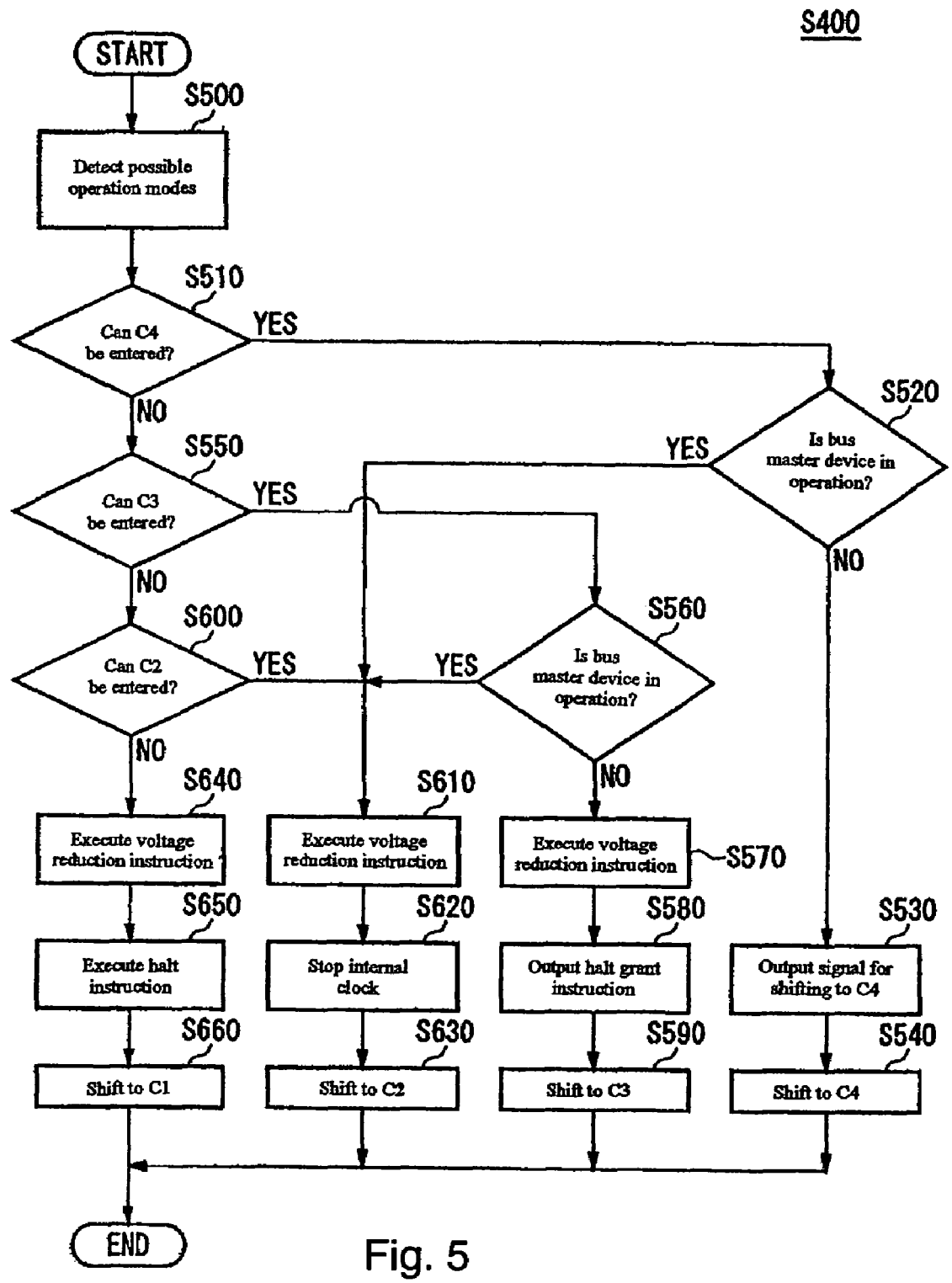
FIG. 5 shows a flowchart of a process performed in step S400 shown in FIG. 4.

FIG. 5 shows a flowchart of a process performed in step S400 in FIG. 4. If the CPU 100 is idle, for example if no process executable by the CPU 100 is detected, the information processor 10 performs the following process. First, the information processor 10 detects possible operation modes which the CPU 100 can enter (S500). For example, the BIOS 180 associates and stores beforehand information indicating possible operation modes of the information processor 10 with the model and user of the information processor 10 and the operating system that controls the information processor 10. The information processor 10 uses this information stored by the BIOS 180 to detect an operation mode that it can enter.

If the CPU 100 can enter the C4 processor power state (S510: YES), the information processor 10 determines whether or not a bus master device that is an input/output device accessing the RAM 150 is operating (S520). If no bus master device is operating (S520: No), the mode controlling module 160 provides an instruction for placing the CPU 100 in the C4 processor power state (namely the voltage reduction mode) to the DC-DC converter 120 (S530) to place the CPU 100 in the C4 processor power state (S540). If a bus master device is in operation (S520: YES), the information processor 10 proceeds to step S610.

If the CPU 100 cannot enter the C4 processor power state (S510: NO) but can enter the C3 processor power state (S550: YES), the information processor 10 determines whether or not any bus master device that is an input/output device accessing the RAM 150 is in operation (S560). If no bus master device is in operation (S560: NO), the voltage controlling module 140 causes the instruction execution module 130 to execute a voltage reduction instruction (S570). The voltage reduction instruction may be an instruction that writes a value that indicates voltage reduction in MSR (Model Specific Registers) of a Mobile Pentium 4 processor, for example. That is, voltage controlling module 140 causes the instruction that writes the value indicating voltage reduction in a register provided in the CPU 100 to be executed. The value in the MSR is written by the CPU 100 into the DC-DC converter 120 to cause it reduce the voltage.

The voltage controlling module 140 causes the instruction execution module 130 to execute a halt grant instruction for sending a halt grant signal to the mode controlling module 160 (S580) to place the CPU 100 in the C3 processor power state (S590). On the other hand, if a bus master device is in operation (S560: YES), the information processor 10 proceeds step S610.

If the CPU 100 cannot enter the C3 processor power state (S550: NO) but can enter the C2 processor power state (S600: YES), the voltage controlling module 140 causes the instruction execution module 130 to execute the voltage reduction instruction (S610). Then the CPU 100 stops its internal clock (S620) to enter the C2 processor power state (S630).

On the other hand, if the CPU 100 cannot enter the C2 processor power state (S600: NO), the voltage controlling module 140 causes the instruction execution module 130 to execute the voltage reduction instruction (S640). The voltage controlling module 140 then causes the instruction execution module 130 to execute a halt instruction (S650) to cause the CPU 100 to place the C1 processor power state (S660).

In this way, for the sake of minimizing power consumption, the information processor 10 focuses each of the processor power states, starting at the one that provides the lowest power consumption, to determine whether or not the CPU 100 can enter that processor power state. Furthermore, before halting the instruction execution module 130 in order to change a processor power state, the information processor 10 decreases the operating voltage of the CPU 100. Thus, the operating voltage of the CPU 100 is reduced to minimize power consumption while halting the instruction execution module 130.

Figure 6:
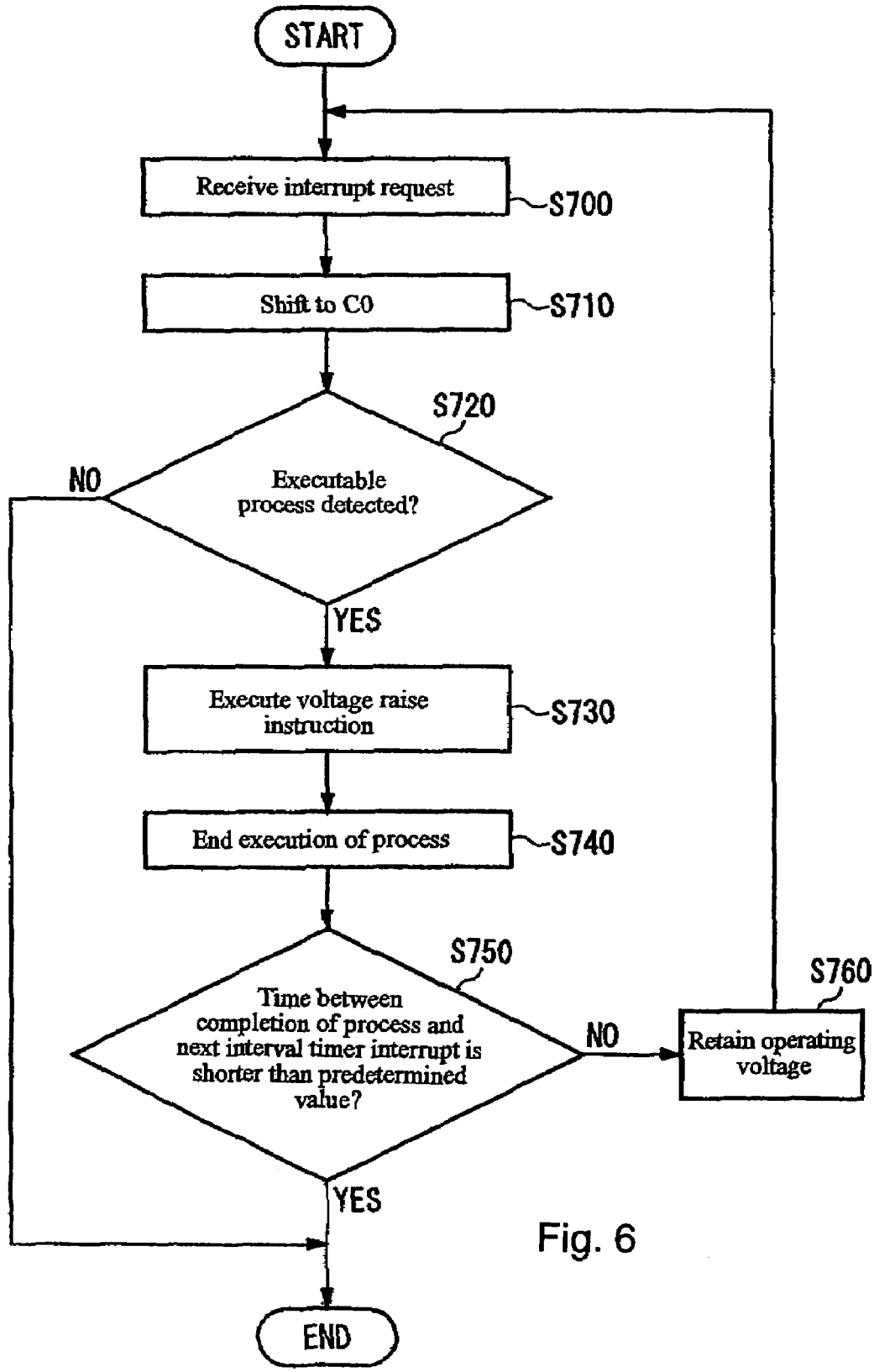
FIG. 6 shows a flowchart of a process performed in step S410 shown in FIG. 4.

FIG. 6 shows a flowchart of a process performed in step S410 in FIG. 4. When the CPU 100 receives an interrupt request such as an interval timer interrupt or an I/O interrupt through the I/O controller 160 and the mode controlling module 160 from the I/O chip 190 (S700), the CPU 100 enters a low-voltage operation mode, for example the C0 processor power state (S710).

The CPU 100 cause the instruction execution module 130 to executes a set of instructions for detecting an executable process. If no executable process is detected (S720: NO), the information processor 10 ends the process shown in FIG. 6 and returns to step S400 in FIG. 5 in order to enter the low-voltage halt mode through the mode controlling module 160.

On the other hand, if an executable process is detected (S720: YES), the voltage controlling module 140 causes the instruction execution module 130 to execute a voltage raise instruction that changes the operating voltage of the CPU 100 to the value in the normal mode (S730) to place the CPU 100 in the normal mode. Then, when the instruction execution module 130 ends the execution of the detected process in the normal mode (S740), the voltage controlling module 140 determines whether or not the time between the completion of the detected process and the next interval timer interrupt exceeds a predetermined value (S750).

If the time between the completion of the detected process and the next interval timer interrupt is shorter than the predetermined time (S750: NO), the mode controlling module 160 proceeds to step S700 while retaining the operating voltage of the CPU 100 without causing the instruction execution module 130 to execute the voltage reduction instruction If the time between the completion of the detected process and the next interval timer interrupt is longer than the predetermined time (S750: YES), the information processor 10 ends the process shown in FIG. 6 and proceeds to step S640, S610, or S570 in FIG. 5 to cause the instruction execution module 130 to execute the power reduction instruction.

In this way, when the CPU 100 receives an interval timer interrupt, it returns to the low-voltage operation mode to detect an executable process. If no executable process is detected, the CPU 100 can immediately return to the low-voltage halt mode. If an executable process is detected, the CPU 100 enters the normal operation mode so that the process can be efficiently executed.

The timing for executing the voltage raise instruction is limited to the example shown in FIG. 6. For example, in order to minimize the power consumption in the information processor 10 according to a user setting, the information processor 10 may avoid executing the voltage raise instruction even if it detects an executable process. On the other hand, in order to make the information processor 10 operate as fast as possible, the information processor 10 may execute the voltage raise instruction before searching for an executable process after it enters the C0 processor power sate in response to an interval timer interrupt. In another example, the information processor 10 may execute the voltage raise instruction when the capacity utilization of the CPU 100 exceeds a predetermined value.

Figure 7:
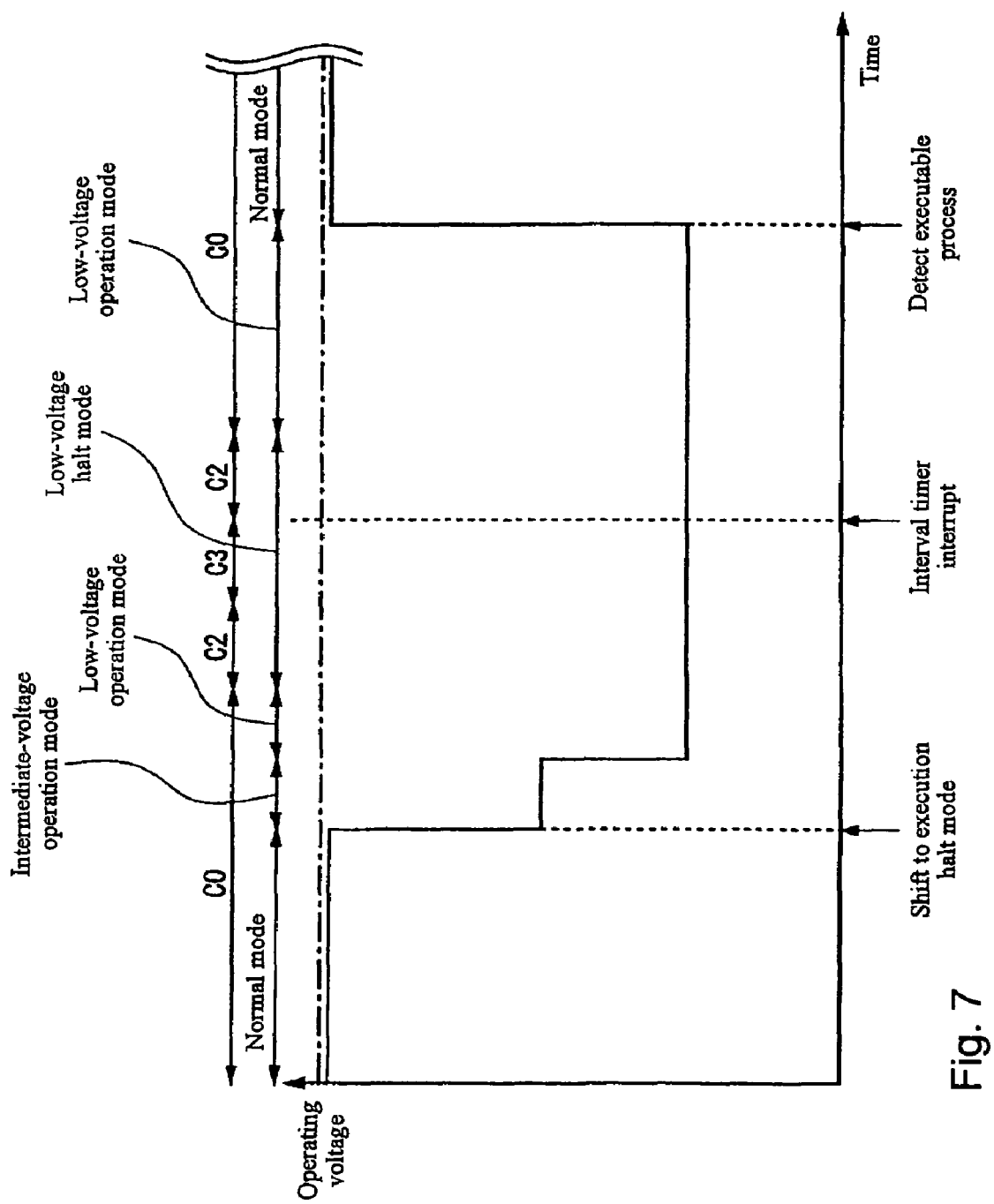
FIG. 7 shows changes in the operating voltage of the CPU 100.

FIG. 7 shows changes in the operating voltage of the CPU 100. In FIG. 7, the solid line indicates the operating voltage of the CPU 100 in the present and the dashed line indicates the operating voltage of another information processor which, like the information processor 10 of the present embodiment, changes its processor power state.

The information processor 10 according to the present embodiment which operates at the operating voltage indicated by the solid line in FIG. 7 will be described below. When the voltage controlling module 140 in the normal mode receives an instruction for entering the execution halt mode, the voltage controlling module 140 causes the CPU 100 to shift from the normal mode to the low-voltage operation mode. In doing so, the voltage controlling module 140 first causes the CPU 100 to the intermediate-voltage operation mode, then causes it to enter the low-voltage operation mode.

Then the mode controlling module 160 causes the CPU 100 to enter a low-voltage halt mode, for example the C2 and C3 processor states, in which the instruction execution module 130 halts at the operating voltage in the low-voltage operation mode. When the CPU 100 receives an interval timer interrupt, it first shifts from the C3 processor power sate to the C2 processor power state, then shifts to the C0 processor power state, which is the low-voltage operation mode. When an executable process is discovered, the mode controlling module 160 causes the instruction execution module 130 to execute a voltage raise instruction to cause the CPU 100 to shift to the normal mode.

In this way, when the information processor 10 shifts from the normal mode to the execution halt mode, it first shifts to the low-voltage operation mode before the C2 processor power state, which is the execution halt mode. Thus, while the instruction execution module 130 is being halted, the operation voltage of the CPU 100 can be reduced compared with the other information processor's operating voltage indicated by the dashed line, and accordingly the power consumption can be reduced. Furthermore, when an interval timer interrupt occurs, the information processor 10 keeps the CPU 100 in the low-voltage operation mode until an executable process is detected. Accordingly, even while the instruction execution module 130 is in operation, the voltage can be appropriately controlled to achieve efficient power consumption.

In the course of causing the CPU 100 to shift from the normal mode to the low-voltage operation mode, the information processor 10 first causes it to enter the intermediate-voltage operating mode. Accordingly, the power consumption can be gradually changed. Consequently, the amount of electric charge stored in and discharged from a capacitor provided for absorbing changes in power consumption can be reduced. For example, if the capacitor causes noise in resonance with other parts of the information processor 10 when the capacitor expands and contracts as it charges and discharges, such noise can be reduced.

In the drawings and specifications there has been set forth a preferred embodiment of the invention and, although specific terms are used, the description thus given uses terminology in a generic and descriptive sense only and not for purposes of limitation.

What is claimed is:

1. An information processor including a central processing unit having an instruction execution module, said central processing unit having a normal mode for operating said instruction execution module and an execution halt mode for halting said instruction execution module; said information processor comprising:
   a voltage controlling module for causing said instruction execution module to execute a voltage reduction instruction for placing said central processing unit into a low-voltage operation mode in which the operating voltage of said central processing unit is lowered from the operating voltage in said normal mode when said central processing unit switches from said normal mode to said execution halt mode;
   a mode controlling module for placing said central processing unit into a low-voltage halt mode in which said instruction execution module is halted under the operating voltage for said low-voltage operation mode after said voltage controlling module places said central processing unit into said low-voltage operation mode;
   wherein said central processing unit periodically receives an interrupt request, said interrupt request being an interval timer interrupt provided periodically to said central processing unit to cause said instruction execution module to execute periodically a set of instructions for detecting an executable process; and when said mode controlling module places said central processing unit into said low-voltage operation mode in response to said interval timer interrupt, said voltage controlling module causes said instruction execution module to execute a voltage raise instruction to place said central processing unit into said normal mode, provided that an executable process is detected; and if no executable process is detected, said mode controlling module places said central processing unit into said low-voltage halt mode.

2. The information processor according to claim 1, wherein: after said voltage controlling module causes said instruction execution module to execute said voltage reduction instruction, said voltage controlling module causes said instruction execution module to execute a halt grant instruction for sending a halt grant signal to said mode controlling module, said halt grant signal allowing said instruction execution module to halt; and said mode controlling module places said central processing unit into said low-voltage halt mode when said mode controlling module receives said halt grant signal.

3. The information processing module according to claim 1, wherein: when said central processing unit receives said interrupt request for resuming said instruction execution module in said low-voltage halt mode, said mode controlling module places said central processing unit into said low-voltage operation mode; and when said mode controlling module places said central processing unit into said low-voltage operation mode in response to said interrupt request, said voltage controlling module causes said instruction execution module to execute a voltage raise instruction for changing the operating voltage of said central processing unit to the operating voltage in said normal mode and places said central processing unit into said normal mode.

4. The information processor according to claim 1, wherein after said instruction execution module completes the process detected in response to said interval timer interrupt, said voltage controlling module causes said instruction execution module to execute said voltage reduction instruction if the time between the completion of said detected process and reception of the next interval timer interrupt exceeds a predetermined value or retains the operating voltage of said central processing unit without causing said instruction execution module to execute said voltage reduction instruction if the time between the completion of said detected process and reception of the next interval timer interrupt does not exceeds the predetermined value.

5. The information processor according to claim 1, wherein said central processing unit further has a voltage reduction mode in which said instruction execution module is halted at a non-zero low operating voltage compared with the operating voltages in said low-voltage operation mode and said low-voltage halt mode; and when said central processing unit is shifted from said normal mode to said voltage reduction mode, said voltage controlling module retains the operating voltage in said normal mode without causing said instruction execution module to execute said voltage reduction instruction; and said mode controlling module causes said central processing unit to shift from said normal mode to said voltage reduction mode.

6. The information processor according to claim 1, wherein when said voltage controlling module causes said central processing unit to shift from said normal mode to said low-voltage operation mode, said voltage controlling module operates said central processing unit and places said central processing unit into an intermediate-voltage operation mode in which the operating voltage is lower than the operating voltage in said normal mode and higher than the operating voltage in said low-voltage operation mode and then places said central processing unit into said low-voltage operation mode.

7. An information processor including a central processing unit having an instruction execution module, said central processing unit having a normal mode for operating said instruction execution module and an execution halt mode for halting said instruction execution module; said information processor comprising:
   a frequency controlling module for causing said instruction execution module to execute a frequency reduction instruction for placing said central processing unit into a low-frequency operation mode in which the operating frequency of said central processing unit is lowered from the operating frequency in said normal mode when said central processing unit switches from said normal mode to said execution halt mode;
   a mode controlling module for placing said central processing unit into a low-frequency halt mode in which said instruction execution module is halted under the operating frequency for said low-frequency operation mode after said frequency controlling module places said central processing unit into said low-frequency operation mode;
   wherein after said frequency controlling module causes said instruction execution module to execute said frequency reduction instruction, said frequency controlling module causes said instruction execution module to execute a halt grant instruction for sending a halt grant signal to said mode controlling module, said halt grant signal allowing said instruction execution module to halt: and said mode controlling module places said central processing unit into said low-frequency halt mode when said mode controlling module receives said halt grant signal.

8. A signal bearing medium tangibly embodying a program of machine-readable instructions executable by a digital processing apparatus to perform operations to control an information processor including a central processing unit having an instruction execution module, said central processing unit having a normal mode for operating said instruction execution module and an execution halt mode for halting said instruction execution module; said operations causing said information processor to function as:

a voltage controlling module for causing said instruction execution module to execute a voltage reduction instruction for placing said central processing unit into a low-voltage operation mode in which the operating voltage of said central processing unit is lowered from the operating voltage in said normal mode when said central processing unit switches from said normal mode to said execution halt mode;

a mode controlling module for placing said central processing unit into a low-voltage halt mode in which said instruction execution module is halted under the operating voltage for said low-voltage operation mode after said voltage controlling module places said central processing unit into said low-voltage operation mode;

wherein when said central processing unit receives an interrupt request for resuming said instruction execution module in said low-voltage halt mode, said mode controlling module places said central processing unit into said low-voltage operation mode; and when said mode controlling module places said central processing unit into said low-voltage operation mode in response to said interrupt request, said voltage controlling module causes said instruction execution module to execute a voltage raise instruction for changing the operating voltage of said central processing unit to the operating voltage in said normal mode and places said central processing unit into said normal mode.

9. A signal bearing medium tangibly embodying a program of machine-readable instructions executable by a digital processing apparatus to perform operations to control an information processor including a central processing unit having an instruction execution module, said central processing unit having a normal mode for operating said instruction execution module and an execution halt mode for halting said instruction execution module; said operations causing said information processor to function as:

a frequency controlling module for causing said instruction execution module to execute a frequency reduction instruction for placing said central processing unit into a low-frequency operation mode in which the operating frequency of said central processing unit is lowered from the operating frequency in said normal mode when said central processing unit switches from said normal mode to said execution halt mode;

a mode controlling module for placing said central processing unit into a low-frequency halt mode in which said instruction execution module is halted under the operating frequency for said low-frequency operation mode after said frequency controlling module places said central processing unit into said low-frequency operation mode;

wherein said central processing unit further has a frequency reduction mode in which said instruction execution module is halted at a non-zero low operating frequency compared with the operating frequencies in said low-frequency operation mode and said low-frequency halt mode: and when said central processing unit is shifted from said normal mode to said frequency reduction mode, said frequency controlling module retains the operating frequency in said normal mode without causing said instruction execution module to execute said frequency reduction instruction; and said mode controlling module causes said central processing unit to shift from said normal mode to said frequency reduction mode.

10. A control method for controlling an information processor including a central processing unit having an instruction execution module, said central processing unit having a normal mode for operating said instruction execution module and an execution halt mode for halting said instruction execution module; said method comprising:

causing said instruction execution module to execute a voltage reduction instruction for placing said central processing unit into a low-voltage operation mode in which the operating voltage of said central processing unit is lowered from the operating voltage in said normal mode when said central processing unit switches from said normal mode to said execution halt mode;

placing said central processing unit into a low-voltage halt mode in which said instruction execution module is halted under the operating voltage for said low-voltage operation mode after said central processing unit is placed into said low-voltage operation mode;

wherein when said voltage reduction instruction causes said central processing unit to shift from said normal mode to said low-voltage operation mode, said instruction execution module places said central processing unit into an intermediate-voltage operation mode in which the operating voltage is lower than the operating voltage in said normal mode and higher than the operating voltage in said low-voltage operation mode and then places said central processing unit into said low-voltage operation mode.

11. A control method for controlling an information processor including a central processing unit having an instruction execution module, said central processing unit having a normal mode for operating said instruction execution module and an execution halt mode for halting said instruction execution module; said method comprising:

causing said instruction execution module to execute a frequency reduction instruction for placing said central processing unit into a low-frequency operation mode in which the operating frequency of said central processing unit is lowered from the operating frequency in said normal mode when said central processing unit switches from said normal mode to said execution halt mode;

placing said central processing unit into a low-frequency halt mode in which said instruction execution module is halted under the operating frequency for said low-frequency operation mode after said central processing unit is placed into said low-frequency operation mode;

wherein said central processing unit periodically receives an interrupt request, said interrupt request being an interval timer interrupt provided periodically to said central processing unit to cause said instruction execution module to execute periodically a set of instructions for detecting an executable process; and when said mode controlling module places said central processing unit into said low-frequency operation mode in response to said interval timer interrupt, said frequency controlling module causes said instruction execution module to execute a frequency raise instruction to place said central processing unit into said normal mode, provided that an executable process is detected: and if no executable process is detected, said mode controlling module places said central processing unit into said low-frequency halt mode.

* * * * *